United States Patent
Filer et al.

(10) Patent No.: US 8,818,195 B2
(45) Date of Patent: Aug. 26, 2014

(54) METHOD OF OPERATING AN OPTICAL TRANSMISSION SYSTEM AND OPTICAL TRANSMISSION SYSTEM

(75) Inventors: Mark Filer, Suwanee, GA (US); Sorin Tibuleac, Duluth, GA (US)

(73) Assignee: ADVA Optical Networking SE (DE)

( * ) Notice: Subject to any disclaimer, the term of this patent is extended or adjusted under 35 U.S.C. 154(b) by 411 days.

(21) Appl. No.: 12/860,337

(22) Filed: Aug. 20, 2010

(65) Prior Publication Data

US 2012/0045222 A1 Feb. 23, 2012

(51) Int. Cl.
*H04J 14/02* (2006.01)

(52) U.S. Cl.
USPC ............... 398/83; 398/158; 398/159

(58) Field of Classification Search
CPC . H04J 14/0201; H04J 14/021; H04J 14/0213; H04J 14/0227; H04J 14/026; H04J 14/0267; H04J 14/02; H04J 2203/0071; H04B 10/2507; H04B 10/25073; H04B 10/2543; H04B 10/255; H04B 10/2557; H04B 10/6163; H04B 10/6165; H04B 15/00; H04B 15/005; H04B 17/0062; H04B 10/00; H04B 10/257137; H04B 10/25133; H04B 10/2519; H04B 2210/25; H04B 2210/252; H04B 2210/254; G02B 6/29394
USPC ............... 398/158, 159, 147, 79, 82, 81, 148, 398/150, 83, 84, 85
See application file for complete search history.

(56) References Cited

U.S. PATENT DOCUMENTS

| | | | |
|---|---|---|---|
| 5,055,795 A * | 10/1991 | Kasper et al. | 330/54 |
| 5,780,843 A | 7/1998 | Cliche et al. | |
| 6,035,080 A | 3/2000 | Henry et al. | |
| 2003/0063286 A1 * | 4/2003 | Fan et al. | 356/477 |
| 2003/0095736 A1 | 5/2003 | Kish et al. | |
| 2004/0101239 A1 * | 5/2004 | Parker | 385/37 |
| 2005/0232640 A1 * | 10/2005 | Boroditsky et al. | 398/152 |
| 2008/0042599 A1 * | 2/2008 | Ashdown | 315/294 |
| 2009/0296751 A1 | 12/2009 | Kewitsch et al. | |
| 2010/0183310 A1 * | 7/2010 | Suzuki et al. | 398/81 |

FOREIGN PATENT DOCUMENTS

| | | | | |
|---|---|---|---|---|
| EP | 1 396 742 A2 | 3/2004 | | |
| EP | 1 517 500 A1 | 3/2005 | | |
| JP | 2004-70166 | * | 3/2004 | G02B 6/00 |
| WO | 2004/095094 A1 | 11/2004 | | |

OTHER PUBLICATIONS

Josh A. Conway et al. ("Phase ripple correction: theroy and application", Optics Letters / vol. 33, No. 10 / May 15, 2008).*

(Continued)

*Primary Examiner* — M. R. Sedighian

(74) *Attorney, Agent, or Firm* — Donald R. Boys; Central Coast Patent Agency, Inc.

(57) ABSTRACT

The invention relates to a method of operating an optical transmission system (100), wherein an optical signal (s, s1) is transmitted (200) through at least one component (102) of said optical transmission system (100) which exhibits spectral phase ripple, and wherein a phase of at least one frequency component of said optical signal (s, s1) is altered (210) by phase influencing means (110) to at least partly compensate for said phase ripple of said at least one component (102), whereby a phase ripple compensated signal (s2) is obtained.

13 Claims, 4 Drawing Sheets

(56) References Cited

OTHER PUBLICATIONS

Conway J A et al: "Phase Ripple Correction: Theory and Application", Optics Letters, OSA, Optical Society of America, Washington, DC, US, vol. 33, No. 10, May 15, 2008, pp. 1108-1110, XP001514609, ISSN: 0146-9592, DOI: 10.1364/OL.33.001108 p. 1108, col. 1, line 1-line 40; figure 2.

Madsen C K et al: "ATunable Dispersion Compensating MEMS All-Pass Filter", IEEE Photonics Technology Letters, IEEE Service Center, Piscataway, NJ, US, vol. 12, No. 6, Jun. 1, 2000, XP011047134, ISSN: 1041-1135, 1. Introduction; p. 651; figure 3 III Experimental Results; p. 652.

* cited by examiner

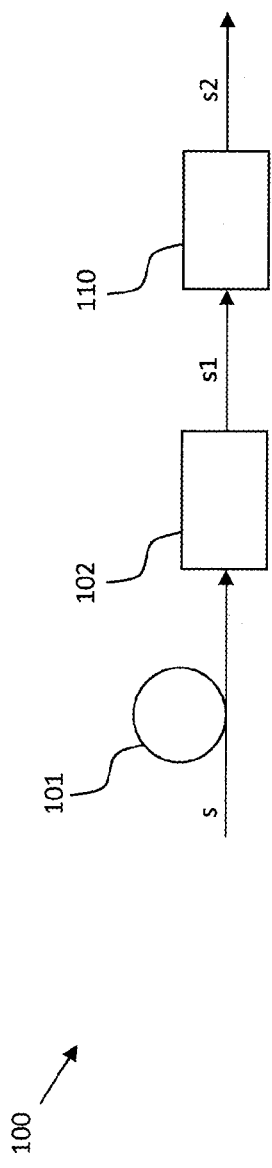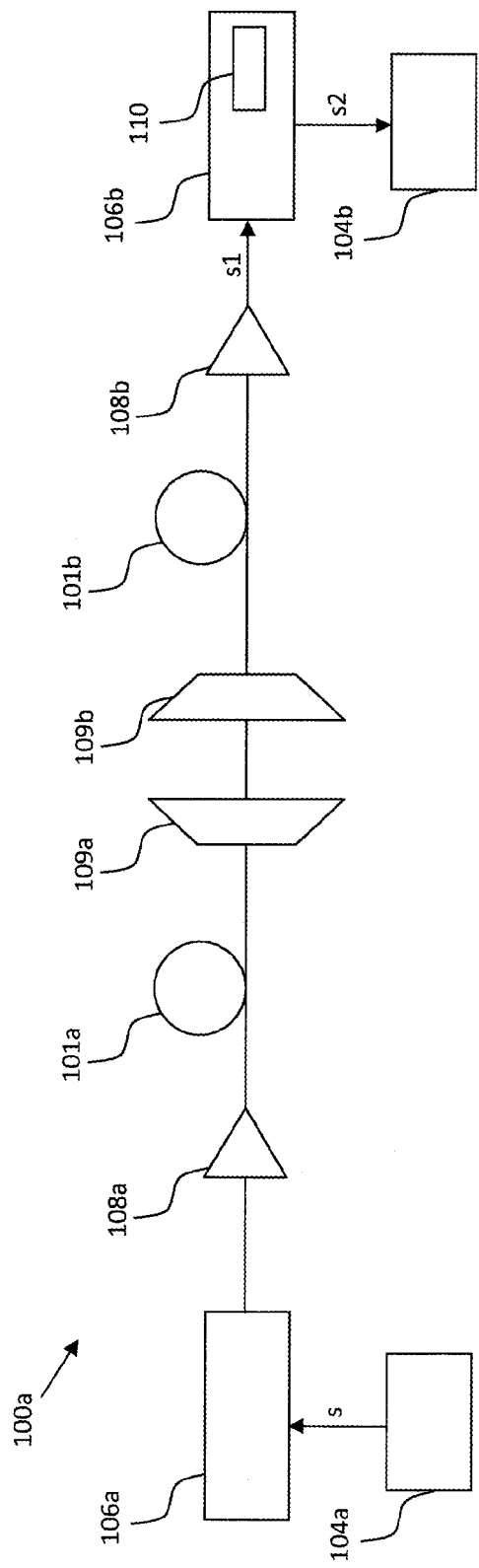

Fig. 5a	Fig. 5b
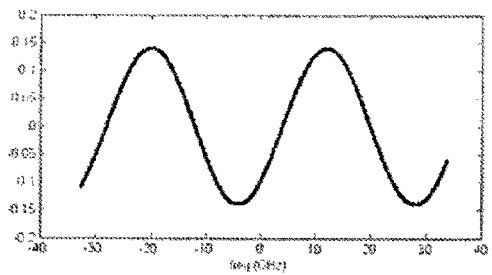 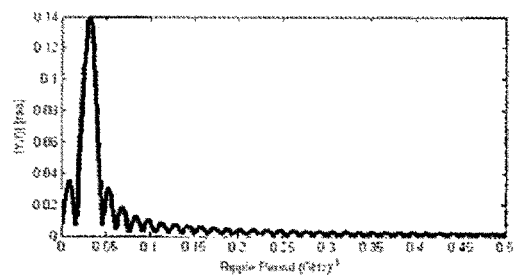
Fig. 6
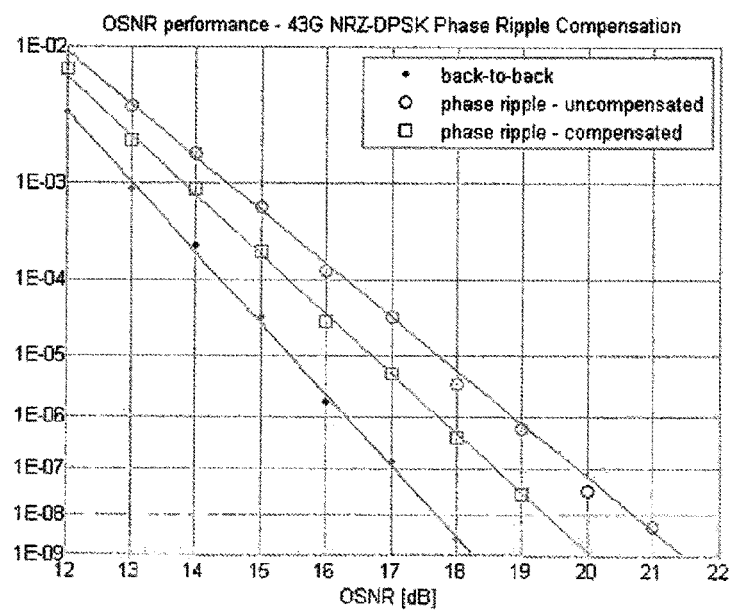

METHOD OF OPERATING AN OPTICAL TRANSMISSION SYSTEM AND OPTICAL TRANSMISSION SYSTEM

FIELD OF THE INVENTION

The present invention relates to a method of operating an optical transmission system, wherein an optical signal is transmitted through at least one component of said optical transmission system which exhibits spectral phase ripple.

The present invention further relates to an optical transmission system for transmitting an optical signal through at least one component of said optical transmission system which exhibits spectral phase ripple.

BACKGROUND

Optical transmission systems suffer from phase ripple effects which are introduced by various optical components or subsystems (dispersion compensation devices, optical multiplexers, filters and amplifiers) which are used to transmit and process optical signals. Current optical transmission systems, particularly dense wavelength division multiplexing, DWDM, systems use more expensive components which produce less phase ripple. Further, it has been proposed to employ less costly components for implementing an optical transmission system which leads to an increased level of undesired phase ripple that can only be mitigated by keeping transmission distances of the optical transmission system comparatively low. I.e., when avoiding the use of expensive hardware, transmission distance has to be limited to account for the impact of phase ripple.

Accordingly, it is an object of the present invention to provide an improved method of operating an optical transmission system and an improved optical transmission system which avoid the disadvantages of the prior art.

SUMMARY

According to the present invention, regarding the above mentioned method of operating an optical transmission system, this object is achieved by altering a phase of at least one frequency component of said optical signal by phase influencing means to at least partly compensate for said phase ripple of said at least one component, whereby a phase ripple compensated signal is obtained.

The inventive method advantageously enables to at least partly mitigate the undesired effects of phase ripple imposed upon optical signals that are transmitted via the optical transmission system. I.e., said step of altering a phase enables to introduce a "compensating phase ripple" which advantageously has a predetermined frequency, amplitude and phase that counteracts the phase ripple of said at least one component.

According to a further aspect of the present invention, alternatively to or in addition to said step of altering a phase of at least one frequency component of said optical signal, a transmission frequency of said optical signal may be altered by a predetermined amount. According to observations of the Applicant, slightly detuning said transmission frequency of the optical signal surprisingly enables to also at least partly mitigate phase ripple effects, because by said step of detuning, a specific portion of the phase ripple response spectrum of the optical transmission system may be found which is lower in ripple magnitude.

According to a preferred embodiment, said phase influencing means alter a respective phase of a plurality of frequency components of said optical signal which leads to an improved mitigation of phase ripple, because compensating phase ripple is provided for a plurality of signal frequencies.

A further very advantageous embodiment of the present invention proposes to use a reconfigurable optical add drop multiplexor, ROADM, which comprises phase control capabilities for implementing the inventive phase influencing means. In many optical transmission systems, ROADMs are present which may be modified to implement the inventive functionality of phase influencing so as to mitigate phase ripple effects.

Thus, no extra hardware has to be added to an optical transmission system to implement the inventive principle. I.e., a dedicated device for phase ripple compensation is not necessary.

According to a further embodiment, a liquid crystal on Silicon, LCOS, array and/or a micro-electro-mechanical mirror array (MEMS) are used for altering a phase of at least one frequency component of said optical signal.

According to a further preferred embodiment, a phase ripple function is applied to the optical signal by said phase influencing means, and a quality measure of said phase ripple compensated signal, particularly a bit error rate, BER, is determined. Thus, the inventive method advantageously enables to iteratively improve the phase ripple compensation by determining such phase ripple functions that lead to low bit error rates. The term phase ripple function denotes information related to phase altering measures involving several frequency components of the optical signal.

Preferably, according to a further embodiment, a relative phase of said phase ripple function is varied until said quality measure reaches a predetermined threshold value, i.e. a minimum value.

According to a further embodiment, at first, a transmission frequency of said optical signal is altered by a predetermined amount to minimize a bit error rate of said optical signal, and, after minimizing the bit error rate, said phase of at least one frequency component of said optical signal is altered thus advantageously combining both aspects of the inventive phase ripple mitigation techniques. Thereby, in the first step, a particularly suitable wavelength range with low phase ripple can be determined for transmission, and after that, the further inventive aspect of phase ripple compensation is applied.

A further solution to the object of the present invention is given by an optical transmission system according to claim 11. Further advantageous embodiments are given by the dependent claims.

BRIEF DESCRIPTION OF THE FIGURES

Further features, aspects and advantages of the present invention are given in the following detailed description with reference to the drawings in which:

FIG. 1 depicts a schematic block diagram of an optical transmission system according to a first embodiment, FIG. 2 depicts a schematic block diagram of an optical transmission system according to a further embodiment, FIG. 5a depicts a compensating phase ripple response determined according to an embodiment of the inventive method, FIG. 5b depicts a Fourier transform of the compensating phase ripple response according to FIG. 5a, FIG. 6 depicts an optical signal to noise ratio performance chart illustrating the effects of the inventive principle.

DESCRIPTION OF THE EMBODIMENTS

Figure 3:
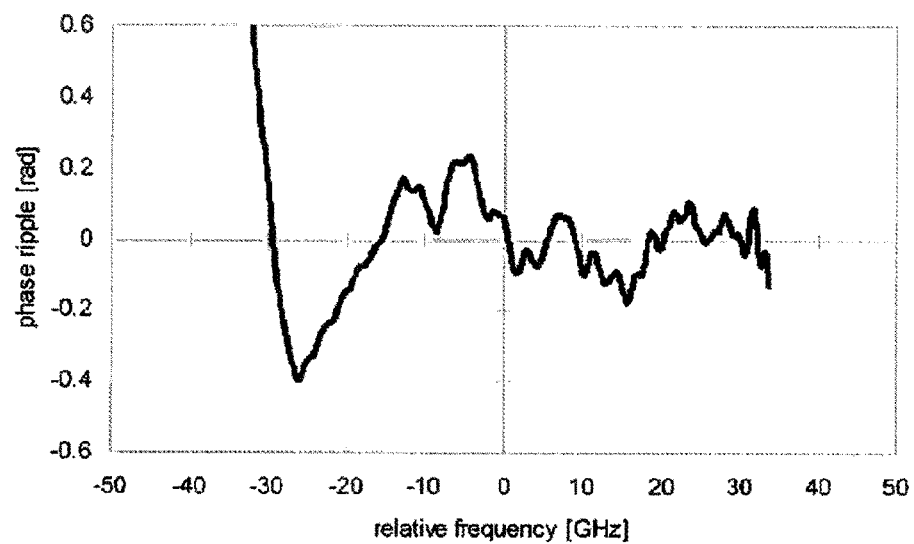
FIG. 3 depicts an exemplary phase ripple response as can be obtained by cascading several fiber Bragg gratings.

FIG. 1 depicts a schematic block diagram of a first embodiment of an optical transmission system 100. The optical transmission system 100 comprises an optical fiber 101 via which an optical signal s can be transmitted in a per se known manner. For instance, the optical signal s is a DWDM signal having a plurality of closely spaced carrier frequencies or wavelengths, respectively.

The optical transmission system 100 further comprises several optical components which introduce undesired phase ripple to the optical signal s when traveling through these components. For simplicity, the phase ripple introducing components are represented in FIG. 1 by the block 102. Due to the addition of phase ripple in a per se known manner to the signal s, at an output of block 102, an optical signal s1 comprising an undesired nonzero phase ripple is obtained.

According to an embodiment, the optical transmission system 100 further comprises phase influencing means 110 which receive the optical signal s1 and which are configured to alter a phase of at least one frequency component of the optical signal s1 in order to mitigate the phase ripple of said components 102 and thus the phase ripple effects imparted on the optical signal s by the components of block 102. Consequently, at an output of the phase influencing means 110, a phase ripple compensated signal s2 is obtained which has a reduced amount of phase ripple as compared to the optical signal s1.

According to an advantageous embodiment, the phase influencing means 110 are configured to alter a respective phase of a plurality of frequency components of said optical signal s1 thus offering a particularly efficient phase ripple mitigation.

The inventive principle illustrated with reference to the embodiment depicted by FIG. 1 advantageously enables to provide larger transmission distances, i.e. high span lengths for the optical fiber 101 and/or higher numbers of spans 101a and 101b (FIG. 2). Furthermore, less costly optical components 102 may be employed for the optical transmission system 100 since their usually higher impact regarding phase ripple on the optical signal s can be at least partially compensated for by the inventive phase influencing means 110.

FIG. 2 depicts a further embodiment of an optical transmission system 100a, which comprises a first reconfigurable optical add drop multiplexor 106a and a first optical transponder 104a configured to provide an optical signal s to the first ROADM 106a. The optical signal s provided by the optical transponder 104a to the first ROADM 106a is added to further optical signals propagating within the optical fiber that connects the ROADM 106a to an optical amplifier 108a. After the optical amplifier 108a, a first span 101a of optical fiber is provided. Optical multiplexer 109a and optical demultiplexer 109b are also part of the optical transmission system 100a. After the optical demultiplexer 109b, a second span 101b of optical fiber is provided. At an output of the second span 101b, the further optical amplifier 108b is provided for amplifying the optical signal s traveling through the components 108a, 101a, 109a, 109b, 101b, 108b. Since at least some of the components 108a, 101a, 109a, 109b, 101b, 108b contribute to the phase ripple of the optical signal s, the optical signal s1 obtained at the output of optical amplifier 108b comprises a substantial amount of undesired phase ripple. The optical signal s1 is fed to the second ROADM 106b which serves to extract at least a part of said signal s1 to the further transponder 104b.

According to the present embodiment, the second ROADM 106b comprises phase influencing means 110 which enable an at least partial phase ripple compensation of the optical signal s1 in the above described manner. Thus, the optical signal s2 forwarded from the second ROADM 106b to the second transponder 104b comprises only a minor amount of phase ripple as compared to the optical signal s1.

According to a particularly advantageous embodiment, the phase influencing means 110 of the second ROADM 106b are an integral part of the components of the second ROADM 106b.

For instance, the second ROADM 106b may comprise some form of phase control capabilities that are suitable for implementing the inventive functionality of the phase influencing means 110.

Alternatively or in addition, phase influencing means may be provided which rely on a liquid crystal on Silicon, LCOS, array and/or on a micro-electro-mechanical mirror array (MEMS) that are configured to alter a phase of at least one frequency component of the optical signal s.

FIG. 3 depicts a graph comprising a sample phase ripple response which may e.g. be achieved by providing a plurality of fiber Bragg gratings within the optical path 102 (cf. FIG. 1).

Figure 4:
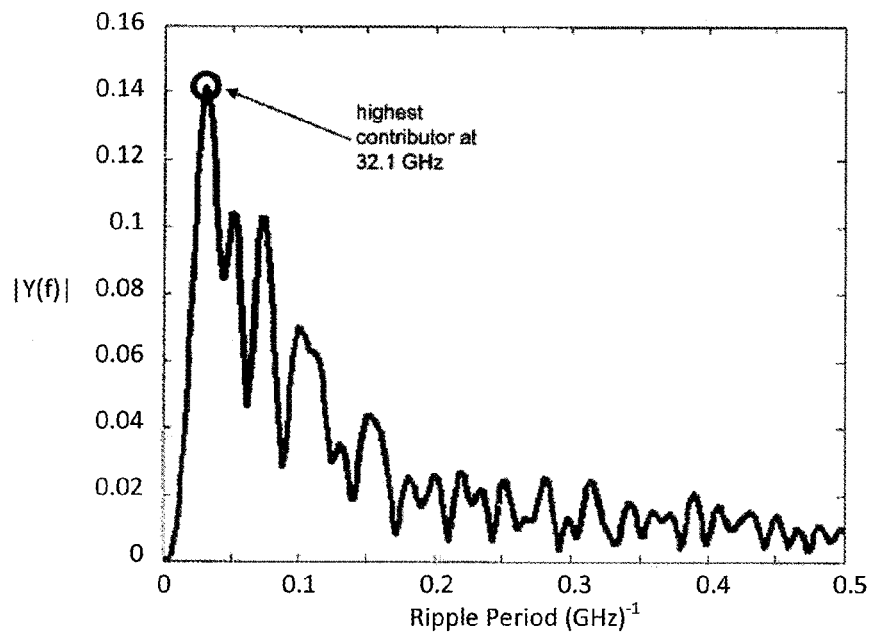
FIG. 4 depicts a Fourier transform of the phase ripple response according to FIG. 3.

FIG. 4 depicts an absolute value of the Fourier transform Y(f) of the phase ripple response depicted by FIG. 3, i.e. a frequency spectrum of the phase ripple response which shows the various components constituting the phase ripple function or phase ripple response of FIG. 3. As can be seen from FIG. 4, the highest contributing frequency component of the phase ripple is for a ripple period of about 32.1*1/GHz.

By configuring the inventive phase influencing means 110 (FIG. 1, FIG. 2), a phase ripple compensation can be provided which is particularly suited to compensate for the highest contributing phase ripple component depicted by FIG. 4.

FIG. 5a comprises an exemplary phase ripple response to be implemented by the inventive phase influencing means 110 in order to mitigate the phase ripple imparted on the optical signal s according to the phase ripple response of FIG. 3.

FIG. 5b depicts an absolute value of a Fourier transform of the phase ripple response according to FIG. 5a. From FIG. 5b it can be gathered that the inventive phase ripple response comprises a substantial signal component a the ripple period value that correlates with the highest ripple contributor of FIG. 4.

According to the preceding observations, configuring the inventive phase influencing means 110 (FIG. 1) to implement a phase ripple response as depicted by FIG. 5a leads to an at least partial cancellation of the effects of the phase ripple accumulated in the optical transmission system according to the phase ripple response of FIG. 3.

According to a preferred embodiment, the relative phase of the compensating phase ripple spectrum is chosen such that an overall bit error rate is minimized, i.e. OSNR penalty at a fixed bit error rate is reduced as compared to an uncompensated case.

As can be gathered from FIG. 6, which depicts the OSNR performance of a phase ripple compensated optical transmission in contrast to a phase ripple uncompensated transmission, a penalty due to accumulated phase ripple is significantly reduced. For a bit error rate (BER) of 1E-05, the OSNR improvement attained by the inventive compensation is about 1 dB.

Although it is particularly preferred to integrate the inventive phase influencing means 110 into existing ROADMs 106a, 106b or to employ ROADMs that have built-in phase altering capabilities, the inventive phase influencing means 110, of course, may also be placed outside of the ROADM 106b, i.e. in the form of a separate device.

Figure 7:
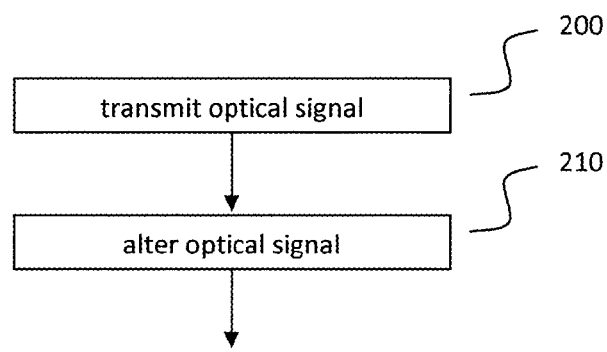
FIG. 7 depicts a simplified flow chart according to an embodiment of the present invention.

FIG. 7 depicts a simplified flow-chart of an embodiment of the inventive method. In a first step 200, an optical signal s is transmitted via the optical transmission system, e.g. via the fiber span 102, cf. FIG. 1. In a second step 210, to at least partly compensate the undesired phase ripple that has accumulated during the transmission of the signal s through components 102, the optical signal s1 is altered in the sense of phase ripple compensation as already explained in detail above, e.g. with reference to FIG. 3, 4, 5a, 5b. Thus, after step 210, a phase ripple compensated signal s2 (FIG. 2) is obtained.

Figure 8:
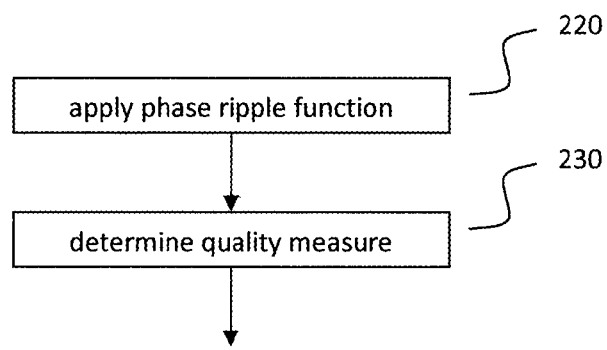
FIG. 8 depicts a simplified flow chart of a further embodiment of the inventive method.

FIG. 8 depicts a simplified flow-chart of a further embodiment of the inventive method. In a first step 220, a phase ripple function, cf. FIG. 5a, 5b, is applied to the optical signal s (FIG. 1) by said phase influencing means 110. Thereby, a phase ripple compensated signal s2 is obtained. Subsequently, in step 230, a quality measure of said phase ripple compensated signal s2, particularly a bit error rate, BER, is determined. If necessary, the process 220, 230 is repeated until the BER has reached a predetermined threshold value. Thus, the inventive method advantageously enables to iteratively eliminate phase ripple by repeatedly determining and applying such phase ripple functions that lead to low bit error rates.

According to a further aspect of the present invention, phase ripple effects may also at least partially be mitigated by a slight detuning of a transmitter center frequency in order to find a portion of the phase ripple response spectrum of the components 102 (FIG. 1) which is lower in ripple magnitude. This embodiment is particularly preferred in optical transmission systems comprising data transmission rates of about 10 Gb/s.

Figure 9:
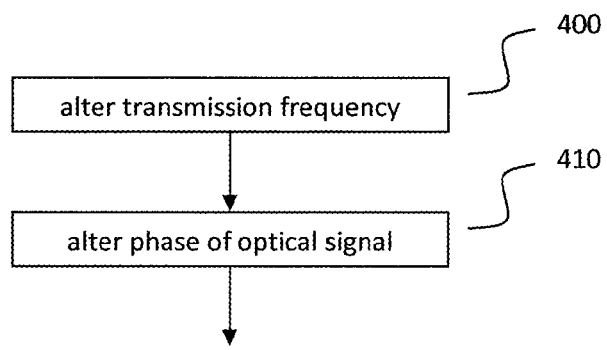
FIG. 9 depicts a simplified flow chart of a third embodiment.

FIG. 9 illustrates a further embodiment of the invention. In a first step 400, the transmission frequency of transponder 104a is slightly altered, e.g. by tuning a center wavelength of a laser source of said transponder 104a by an amount of 0.01 nm (nanometers) up to about 0.25 nm. Thereby, it is possible to find a part of a phase ripple response spectrum of the components 102 (FIG. 1) which is lower in ripple magnitude, i.e. imparts less phase ripple on signal s. After that, in step 410, a phase of the optical signal s comprising a signal component generated by said transponder 104a is altered in the sense of phase ripple compensation. I.e., the method according to FIG. 9 represents an approach wherein two different measures are taken to avoid and compensate undesired phase ripple. Firstly, a particularly suitable wavelength range regarding phase ripple response is determined in step 400, and a remaining phase ripple is compensated in step 410. It is obvious that steps 400, 410 can be executed repeatedly or with other sequence than explained above.

The above described embodiments advantageously enable to reduce penalty imposed on optical transmissions by accumulated phase ripple of the optical components 102 such as fiber Bragg grating dispersion compensating modules and others (FIG. 1). The achieved improvements in performance, i.e. BER, OSNR, enable longer transmission distances without electronic regeneration of the signal s, s1, which, in turn, leads to lower-cost DWDM systems.

By using existing ROADMs 106b (FIG. 1) and other optical devices having built-in phase altering capabilities, the implementation of the inventive principle adds no hardware-based capital cost. The inventive phase ripple compensation may—at least largely—rather be implemented in software, e.g. in a control device of said ROADM 106b. Further, if appropriate lasers and ROADMs are used in the system 100, it may be possible to perform phase ripple compensation for wavelengths of the signal s that are carrying live traffic. Thus, BER and/or OSNR improvements can be achieved for a deployed system without traffic interruptions.

The invention claimed is:

1. Method of operating an optical transmission system, comprising the steps of:
   (a) transmitting an optical signal (s, s1) on an optical fiber through at least one component of said optical transmission system which causes the signal (s, s1) to exhibit spectral phase ripple;
   (b) receiving the signal including spectral phase ripple at a reconfigurable optical add drop multiplexor (ROADM);
   (c) altering a phase of at least one frequency component of said optical signal (s, s1) by phase influencing means of the ROADM to at least partly compensate for said phase ripple of said at least one component; and
   (d) obtaining a phase ripple compensated signal (s2).

2. Method according to claim 1, wherein, alternatively to or in addition to said step (c) of altering a phase of at least one frequency component of said optical signal (s, s1), a transmission frequency of said optical signal (s, s1) is altered by a predetermined amount.

3. Method according to claim 2, wherein said step of altering said transmission frequency comprises detuning said transmission frequency by an amount of about 0.01 nanometers up to an amount of about 0.25 nanometers.

4. Method according to claim 2, wherein, at first, said transmission frequency of said optical signal (s, s1) is altered by a predetermined amount to minimize a bit error rate of said optical signal, and wherein, after minimizing the bit error rate, said phase of at least one frequency component of said optical signal (s, s1) is altered.

5. Method according to claim 1, wherein said phase influencing means alter a respective phase of a plurality of frequency components of said optical signal (s, s1).

6. Method according to claim 1, wherein a liquid crystal on Silicon, LCOS, array and/or a micro-electro-mechanical mirror array are used for altering a phase of at least one frequency component of said optical signal (s, s1).

7. Method according to claim 1 wherein a phase ripple function is applied to the optical signal (s, s1) by said phase influencing means, and wherein a quality measure of said phase ripple compensated signal (s2), particularly a bit error rate, BER, is determined.

8. Method according to claim 7, wherein a relative phase of said phase ripple function is varied until said quality measure reaches a predetermined threshold value.

9. Optical transmission system for transmitting an optical signal (s, s1), comprising;
   an optical signal (s, s1) transmitted on an optical fiber through at least one component causing spectral phase ripple of said signal (s, s1);
   a phase influencing means of a reconfigurable optical add drop multiplexor (ROADM) connected to the optical fiber;
   wherein the phase influencing means of the ROADM is configured to influence a phase of at least one frequency component of said optical signal (s, s1) to at least partly compensate the phase ripple caused by the at least one component of said optical transmission system.

10. Optical transmission system according to claim 9, wherein said phase influencing means are configured to alter a respective phase of a plurality of frequency components of said optical signal (s, s1).

11. Optical transmission system according to claim 9, wherein said phase influencing means comprise at least one liquid crystal on silicon, LCOS, array and/or a micro-electro-mechanical minor array for altering a phase of at least one frequency component of said optical signal (s, s1).

12. Optical transmission system according to claim 9, wherein said optical transmission system is configured to apply a phase ripple function to the optical signal (s, s1) by said phase influencing means, and wherein said optical transmission system is configured to determine a quality measure of said phase ripple compensated signal (s2) obtained by said phase influencing means.

13. Optical transmission system according to claim 12, wherein said optical transmission system is configured to vary a phase of said phase ripple function until said quality measure reaches a predetermined threshold value.

* * * * *